United States Patent [19]

Smith

[11] 4,426,461

[45] Jan. 17, 1984

[54] MODIFIED POLYISOCYANURATE FOAM AND METHOD OF PREPARATION

[75] Inventor: Stuart B. Smith, Conyers, Ga.

[73] Assignee: Thermocell Development, Ltd., Knoxville, Tenn.

[21] Appl. No.: 398,369

[22] Filed: Jul. 14, 1982

[51] Int. Cl.³ .................. C08G 18/14; C08G 18/18; C08G 18/22; C08G 18/30
[52] U.S. Cl. .................. 521/116; 521/117; 521/121; 521/125; 521/130; 521/131; 521/166; 521/902; 521/903
[58] Field of Search .............. 521/902, 116, 121, 117, 521/130, 125, 166, 131, 903

[56] References Cited

U.S. PATENT DOCUMENTS

| | | | |
|---|---|---|---|
| 4,040,992 | 8/1977 | Bechara et al. | 521/902 |
| 4,101,465 | 7/1978 | Lockwood et al. | 521/118 |
| 4,116,879 | 9/1978 | Bechara et al. | 252/426 |
| 4,136,240 | 1/1979 | Zimmerman et al. | 521/902 |
| 4,166,164 | 8/1979 | Cenker et al. | 521/129 |
| 4,169,921 | 10/1979 | Moss et al. | 521/125 |
| 4,177,335 | 12/1979 | Austin et al. | 521/171 |
| 4,186,255 | 1/1980 | Klein et al. | 521/128 |
| 4,189,541 | 2/1980 | Ohashi et al. | 521/110 |
| 4,221,875 | 9/1980 | Yukuta et al. | 521/128 |
| 4,349,638 | 9/1982 | Narayan | 521/125 |
| 4,362,823 | 12/1982 | Wernsing | 521/116 |

*Primary Examiner*—H. S. Cockeram
*Attorney, Agent, or Firm*—Richard P. Crowley

[57] ABSTRACT

An isocyanurate thermosetting foam composition having improved flame, smoke and nonburning properties with high char resistance, which foam composition is prepared by the reaction of from about 5 to 40 parts of a methoxy polyethylene glycol and optionally with melamine, with 100 parts of a methylene diisocyanate having an average functionality of about 2.4 or less in the presence of a blowing agent, a surfactant and a single trimerization catalyst, to provide a closed-cell, thermosetting, modified polyisocyanurate foam having a flame-spread value of about 15 or less.

30 Claims, No Drawings

MODIFIED POLYISOCYANURATE FOAM AND METHOD OF PREPARATION

BACKGROUND OF THE INVENTION

Polyisocyanates have been reacted in the presence of a trimerization catalyst to produce polyisocyanurate foams, in an attempt to produce foams which produce high char resistance to fire and low smoke vaklues. The trimerization of polyisocyanates produces foams of superior fire performance over conventional polyurethane foams. The rigid trimerized polyisocyanurate-type foams produced tend to have higher K-factors than urethane foams, but also are quite brittle and friable in nature. The trimerization of methylene diisocyanate produces a foam of low smoke value, but black in color, and which foam is relatively nonburning. The problems with such methylene diisocyanate trimerized foam are the poor compressive strength high friability.

In order to correct or to mask these undesirable properties, it has been the practice to incorporate small amounts of urethane polyols, such as sucrose amine, glycols or aromatic amines in the isocyanate reaction mixture, to produce a modified, urethane polyisocyanurate foam. However, the addition of such urethane polymers leads to degradation in the fire and smoke properties of the modified foam.

One standard, widely accepted, two-stage catalyst system used in industry in the preparation of polyol-modified polyisocyanurate foam comprises the combination of dimethyl aminomethyl phenol known as DMP-30 and potassium octoate (see, for example, U.S. Pat. No. 4,101,465). Modified polyisocyanurate foams have been prepared with the standard catalyst and polyethylene glycol 400 in the presence of a blowing agent and a surfactant. In such foam preparation, the higher the ratio of the polyethylene glycol to isocyanate, the more flexible the foam; however, the higher glycol content reduces the fire and flame properties of the foam. The standard catalyst system used permits some urethane linkages to form before trimerization of the isocyanate. The resulting foam, with higher ratios of polyol to isocyanate, then causes black smoke and a reduction in burning properties, so that flame-retardant agents are added to reduce the flame-spread properties. If low ratios of glycol to isocyanate are employed, often flame-retardant agents may be omitted, but the foam has more rigid and friable properties.

Polyurethane foams; that is, foams prepared by the reaction of a polyhydroxyl compound and a polyisocyanate in the presence of a urethane catalyst, provide foams of unacceptable flame resistance. It has been proposed that such polyurethane foams be modified by the addition of a nonreactive amount of a melamine powder in the reaction mixture, to confer enhanced flame resistance on the resulting polyurethane foam (see U.S. Pat. No. 4,221,875, issued Sept. 9, 1980).

It is desirable to prepare an inexpensive foam composition of low flame-spread properties and which avoids the disadvantages of the rigid and modified polyisocyanurate foams and the polyurethane foams of the prior art, while retaining the advantages of such foams.

SUMMARY OF THE INVENTION

The invention relates to a modified polyisocyanurate foam and the method of preparing the foam. In particular, the invention concerns a low-functionality, methylene diisocyanate, thermosetting foam and the method for preparing same, which foam is characterized by high compressive strength, low K-values, low flame-spread and smoke properties and other desirable physical properties and particularly having high char resistance, which foam products are suitable for use in the construction and insulation field.

It has been discovered that a modified polyisocyanurate foam of improved physical and fire properties can be prepared by the reaction of a methylene diisocyanate having a low functionality; for example, typically less than about 2.4; for example, about 2.0, with a glycol compound which includes an alkoxy polyalkylene glycol, such as methoxy polyethylene glycol, in the presence of a blowing agent, a surfactant and a trimerization catalyst, and in the absence of a urethane catalyst, and, optionally, in the presence of a melamine.

In one embodiment, a modified rigid foam composition, having a flame spread of less than 15 and with good char resistance, is prepared by the reaction of 100 parts of a methylene phenyl diisocyanate having an average functionality of about 2.4 or less, with a glycol composition comprising a combination of from 5 to 40 parts of a methoxy polyethylene glycol alone or with a polyol, suc as a polyethylene glycol, and a flame-retardant amount of melamine, which amount is in excess of the concentration of the glycol composition, the reaction carried out in the presence of a fluorocarbon blowing agent, a silicone surfactant and a single-stage trimerization catalyst. The catalyst preferably consists essentially of a quaternary ammonium salt or potassium octoate, or a combination thereof. The resulting rigid foam has good physical and fire properties and typically is characterized by a flame spread and smoke value of about 15 or less. The reaction is characterized by a rapid and high exotherm rise after mixing of the reaction to about 230° F. or higher, usually in about 10 seconds or less. Further, it has been found that the addition of small amounts of a sulfonic acid is desirable, to promote a greater initial exotherm to avoid the initial formation of any urethane linkages.

The modified polyisocyanurate foams are prepared employing as an essential component a glycol compound which comprises: an alkoxy polyalkylene glycol, such as a $C_1$-$C_3$ alkoxy poly $C_1$-$C_3$ alkylene glycol, particularly a methoxy polyalkylene glycol, such as a methoxy polyethylene or methoxy polypropylene glycol. Typically, such methoxy glycols have a low hydroxyl number of from about 100 or less and represent glycols where an alkoxy group, such as a methoxy group, is substituted for the hydroxyl group at the one end of the glycol. The employment of methoxy polyalkylene glycol (MPEG) often permits a reduction; for example, of 5% to 25%, of the expensive trimerization catalyst, since the MPEG is very reactive and reduces the cure time.

The alkoxy polyalkylene glycols are employed in an amount sufficient to modify the burning characteristics of the foam composition; that is, to increase char resistance and to provide low flame-spread and smoke values under ASTM E-84; for example, to less than 25 and often to 15 or less. The methoxy glycol compounds are employed in amounts of from about 5 to 40 parts per 100 parts of the methylene diisocyanate used in the reaction and after from 20 to 35 parts per 100 parts. The alkoxy glycols not only improve the burning properties of the foam, but are useful as stabilizers and emulsifiers in the reaction mixture, particularly when the alkoxy glycol is esterified.

The alkoxy polyalkylene glycols useful in the invention have the structural formula:

$$R_1O-(-R_2-O-)_{\overline{n}}H$$

wherein $R_1$ is a lower alkyl group, such as a methyl, ethyl or propyl group, and $R_2$ is a di or tri methylene group; for example, ethylene or propylene group, and n is a number from about 3 to 20; for example, 4 to 10, with the preferred glycol being methoxy polyethylene glycol. The glycol typically is a liquid with an average molecular weight of less than about 600; for example, 275 to 550. The alkoxy polyalkylene glycols useful in the invention include, but are not limited to, methoxy polyethylene glycol, methoxy polypropylene glycol, ethoxy polypropylene glycol and mixtures and combinations thereof.

The use of MPEG in the reaction mixture aids in retaining the fluorocarbon blowing agent, the melamine and other glycol compounds, such as polyethylene glycol, in one phase and to inhibit separation of these components into different phases. The use of MPEG provides enhanced char resistance of the resulting rigid foam. Polyisocyanurate foam, alone, and modified with polyethylene glycol (PEG), tends to char and then crack, when exposed to an open propane torch in the flame-spread test, thereby exposing new foam material to the open flame. The development of a strong char on the foam, without cracking of the foam after charring, is desirable, since the high char then tends to insulate the foam from the open flame. It has been discovered that the use of alkyoxy glycols, such as MPEG, inhibits and prevents both cracking and foam shrinking, leading to high char and low flame-spread and smoke values.

The glycol compositions employed typically include relatively low hydroxyl-number polyalkylene glycols as a cost compromise, to reduce the cost of the foam composition, since the MPEG is more expensive than its analog, polyethylene glycol (PEG). The usual glycol composition comprises a mixture of polyethylene glycol having a hydroxyl number of less than 300; for example, 150 to 225, and methoxy polyethylene glycol with a hydroxyl number of less than 100; for example, 70. Other polyglycols and mixtures can be used; however, the total glycol composition; for example, the PEG and MPEG, should not exceed about 40 parts per 100 parts of the diisocyanate and an average hydroxyl number of about 150, since more urethane linkages tend to form in the foam. Usually, the lower concentration level is about 20 parts per 100 parts of diisocyanate, with 25 to 35 parts being the preferred range, where a combination of the MPEG and PEG is used. When MPEG, alone, can be employed without regard to cost consideration, and the range of the MPEG, alone, may vary, depending on the properties of the foam desired.

It has been found that the addition of small amounts of an acid catalst, particularly a sulfonic acid like an organic sulfonic acid like toluene sulfonic acid, in an amount of less than about 1 part per 100 parts of diisocyanate; for example, 0.05 to 0.5 parts, is desirable. For example, the use of an organic sulfonic acid with the glycol may form monoesters. The resulting fatty-acid monoesters, particularly those with MPEG, have a high surface tension and are useful detergent, emulsifying and dispersing agents in the mixture, further reducing the tendency of the reaction mixture to separate on mixing and before reaction.

The reaction mixture optionally may contain melamine, with the amount of melamine being sufficient to provide a flame-retardant foam, and particularly to reduce the smoke value of the foam, and more particularly in an amount of over 100 parts of melamine per 100 parts of the glycol composition; for example, 125 to 200 parts per 100 parts of the glycol composition, such as 125 to 150 parts. However, the employment of excess melamine should be avoided, in order to avoid sublimation of unreacted melamine and the production of white smoke and toxic hydrocyanic gas at high temperatures.

It has been discovered that, while the use of melamine as a nonreactive or reactive flame retardant is advantageous, the omission of melamine results in a foam of only higher smoke values; for example, up to about 150. The foam produced with the use of the MPEG without melamine provides a foam which still retains and has excellent nonburning and compressive-strength properties. The use of melamine is not desirable, where the foam composition is formed by spray-foaming techniques, since the melamine particles tend to plug the orifices of the spray nozzles used.

The reaction is carried out in the presence of a trimerization catalyst with methylene diisocyanate. The methylene diisocyanate should not comprise the standard or conventional crude methylene phenyl diisocyanate mixture having a functionality, for example, of about 2.7 or greater, but rather it has been discovered that methylene diisocyanates of high acid number; that is, of a functionality of about 2.4 or less; for example, 2.0, and, for example, with a minimum of 50% of difunctional groups, provide for the production of a modified thermosetting foam of lower smoke and flame-spread values by ASTM E-84 tests. It is believed that the higher functionality methylene diisocyanate products contain more stearic hindrance, which inhibits the more rapid cross-linking of the isocyanate in polyisocyanurate linkages, and, therefore, methylene diisocyanates of lower functionality than 2.7, particularly about 2.4 or lower, are desirable, to promote rapid reaction. The higher functionality methylene diisocyanates are believed to permit the formation of more urethane linkages to form before trimerization occurs and, therefore, to produce lower quality foams. Typical methylene diisocyanates would include, but not be limited to, aromatic and dicyclic compounds, 4,4'-methylene bis(phenyl isocyanate), 4,4'-methylene bis(tolyl isocyanate), 4,4'-methylene bis(cyclohexyl isocyanate) and the like.

The reaction of the polyester melamine reaction product with the methylene diisocyanate is carried out in the presence of a blowing amount of a blowing agent, typically a liquid halocarbon, such as a fluorocarbon, and more particularly a chlorofluoro methane or ethane, such as, for example, fluorotrichloro methane, so as to provide the resulting closed-cell thermosetting foam composition with a low K-factor and high insulating properties, typically less than about 0.15 K-factor. The blowing agent may be employed in varying amounts, such as, for example, from about 1 to 20 parts of blowing agent per 100 parts of the methylene diisocyanate, and more particularly about 5 to 15 parts.

The reaction is also carried out in the presence of a surfactant or cell-control agent, typically a silicone surfactant. More particularly, it has been found that, where a fluorocarbon blowing agent is employed, the silicone employed should be a silicone-glycol surfactant, rather than the nonglycol-silicone surfactant, in order to enhance the compatibility of the fluorocarbon in the reaction system. For example, a silicone-glycol copolymer employed as a cell-control agent may be used, the silicone-glycol copolymer being more soluble in the glycol composition. If desired, a combination of silicone-glycol surfactant, together with a standard silicone surfactant, may be employed. The surfactant is typically used in an amount of from 0.05 to 5 parts per 100 parts of the methylene diisocyanate; for example, 0.1 to 2 parts.

The reaction is carried out also in the presence of one or more trimerization catalysts and in the absence of catalysts which tend to form urethane linkages; that is, in the absence of urethane catalysts. The trimerization-catalyst system employed should not be the conventional two-stage system, since such a system permits the formation of urethane linkages. A single-stage system, and typically a single catalyst which provides a rapid and very high exotherm; for example, over 230° F.; for example, over 250° F. is desirable, in less than about 10 seconds. Such a system provides immediate trimerization, reducing urethane linkages.

Trimerization catalysts, for use in the preparation of the isocyanurate foams of the invention, comprise quaternary ammonium salts and fatty-acid esters of alkali metals, such as potassium, such as, for example, $C_6$–$C_{12}$ fatty-acid esters like potassium octoate. Standard urethane-type catalysts which promote the formation of urethane linkages, such as the triethylene diamines or tin fatty-acid catalysts, should not be used. The dimethyl aminomethyl phenolsm, or a two-stage combination, with the ester catalyst should not be used, with the most preferred catalyst comprising the quaternary ammonium salts or potassium octoate alone or in combination.

The amount of the trimerization catalysts may vary, but typically ranges from 0.1 to 15 parts; for example, 1 to 10 parts, per 100 parts of the methylene diisocyanate. It is preferred that trimerization catalysts of the quaternary ammonium salts be used alone. One preferred single-stage catalyst system comprises the use of quaternary ammonium catalysts, such as the N-hydroxyl alkyquaternary ammonium carboxylic salts, such as those catalysts described in U.S. Pat. No. 4,040,992, issued Aug. 9, 1977, hereby incorporated by reference. The trimerization-catalyst system should be selected, so that there is a long delay cream time of the reaction and then a very fast foam cure time, so as to permit the reaction mixture to produce the foam on a continuous basis in conventional production-line mixing equipment.

The foam composition of the invention may be characterized by having a compressive strength generally of greater than about 30 psi, and typically about or greater than 40 psi, and, with an ASTM E-84 Butler tunnel test, a flame spread of 20 or less, and typically 15 or less, and a smoke value of about 25 or less, and typically about 15 or less, when melamine is used in the mixture. The density of the foam produced may vary, depending upon the selection of the ingredients, but the foam produced is a fine-cell, closed-cell foam having a density of about 5 lbs. per cubic foot or less, and more typically from about 1.5 to 3 lbs. per cubic foot.

One method of preparation of the foam composition comprises the mixing of the components directly at room temperatures; for example, 50° F. to 80° F., and the addition of the surfactant, blowing agent and trimerization catalyst and, thereafter, the addition of the methylene diisocyanate with mixing, to provide an exothermic reaction and the creation of the resulting thermosetting foam product.

The invention will be described in connection with certain embodiments; however, it is recognized that various changes and modifications may be made by those persons skilled in the art, all falling within the spirit and scope of the invention.

DESCRIPTION OF THE EMBODIMENTS

Example 1

| | |
|---|---|
| 25 parts | Polyethylene glycol 400 (PEG) |
| 100 parts | Methylene diisocyanate (Crude MDI); functionality 2.7–3.0 (Rubinate M - Rubicon Chemical Co.) |
| 1 part | Silicone surfactant (DC-197 - Dow Chemical Co.) |
| 1 part | Potassium octoate - trimerization catalyst |
| 1 part | Dimethylaminomethyl phenol (DMP-30) - trimerization catalyst |
| 30 parts | Freon F-11 - fluorotrichloro methane |
| Density: 2.0 PCF | Cream time: 10 seconds |
| Cured: 120 seconds | Tack Free: 60 seconds |
| K-Factor: .125 | Compressive Strength: @ 10% 24 PSI |
| Friability: Good | Flame Spread: 25 |
| Smoke: 200 | Density: 2.0 pcf |

This standard prior art glycol modified polyisocyanurate foam has a very high smoke value and low compressive strength.

Example 2

| | |
|---|---|
| 25 parts | Polyethylene glycol 400 (PEG) |
| 30 parts | Freon F-11 - fluorotrichloro methane |
| 1 part | Silicone surfactant (DC-197 - Dow Chemical Co.) |
| 2 parts | TMR - a quaternary ammonium salt trimerization catalyst (Air Products Co., Inc.) |
| 30 parts | Melamine |
| 100 parts | Methylene diisocyanate (Crude MDI); functionality 2.7–3.0 (Rubinate M - Rubicon Chemical Co.) |
| K-Factor: .125 | Compressive strength: 15 psi |
| Friability: Good | Flame Spread: 30 |
| Smoke: 190 | Cream time: 6 seconds |
| Tack Free: 22 seconds | Density: 2.0 pcf |
| Cured: 33 seconds | |

This example shows the use of melamine in a polyethylene glycol modified polyisocyanurate foam.

Example 3

| | |
|---|---|
| 25 parts | Polyethylene glycol 400 (PEG) |
| 30 parts | Freon F-11 - fluorotrichloro methane |
| 1 part | Silicone surfactant (DC-197 - Dow Chemical Co.) |
| 2 parts | TMR - a quaternary ammonium salt trimerization catalyst (Air Products Co., Inc.) |
| 30 parts | Melamine |
| 100 parts | Methylene diisocyanate (MDI); functionality of 2.4, acid number 280 (Rubicon Chemical Co.) |
| K-Factor: .115 | Compressive strength: 20 psi |
| Friability: Excellent | Flame spread: 15 |
| Smoke: 45 | Cream Time: 6 seconds |
| Tack Free: 10 seconds | Density: 2.0 pcf |
| Cure: 12 seconds | |

This example shows the use of a high reactivity MDI to promote trimerization with a reduction in flame spread and smoke values.

Example 4

| | |
|---|---|
| 20 parts | Polyethylene glycol 400 (PEG) |
| 5 parts | Methoxypolyethylglycol (MPEG) (Union Carbide Co.) |
| 30 parts | Melamine |
| 30 parts | Freon F-11 - fluorotrichloro methane |
| 1 part | Silicone surfactant (DC-197 - Dow Chemical Co.) |
| 2 parts | TMR |
| 100 parts | Methylene diisocyanate (MDI); functionality of 2.4, acid number 280 (Rubicon Chemical Co.) |
| K-Factor: .115 | Flame Spread: 15 |
| Smoke: 15 | Compressive strength: 30 psi |
| Density: 2.0 pcf | Cream time: 6 seconds |
| Tack Free: 10 seconds | Cured: 12 seconds |

Example 5

Because of the addition of MPEG 550 as in example #4, a reduction in catalyst from 2.0% to 1.75 was used, no change in properties were obtained; however, the cure time increased.

In all examples where the MPEG is not present in the reaction mixture (Examples 1–3) and the mixture was left standing without agitation, then the melamine would separate to the bottom of the vessel and the PEG 400 and the blowing agent would also separate. The addition and used of MPEG eliminated separation of the PEG and blowing agent and increased the reaction mixture viscosity inhibiting the separation of melamine.

Example 6

| | |
|---|---|
| 20 parts | MPEG 550 |
| 1 part | Silicone (DC-197) |
| 25 parts | F-11 |
| 2 parts | TMR |
| 100 parts | Methylene diisocyanate (MDI) functionality of 2.4 (#182 Rubicon Chemical Co.) |
| K-factor: .115 | E-84 flame spread: 20 |
| Smoke: 150 | Compressive strength: 30 psi |
| Density: 2.2 pcf | Cream time: 2 seconds |
| Butler chimney: 95% retained | Cured: 10 seconds |

Example 7

Same as Example 6, but using conventional methylene diisocyanate having a functionality of 2.7 to 3.0 (Rubinate M).

| | |
|---|---|
| K-factor: .117 | Flame spread: 30 |
| Smoke: 250 | Compressive strength: 30 psi |
| Density: 1.9 | Cream time: 10 seconds |
| Butler chimney: 89% retained | Cured: 25 seconds |

Example 8

Same as Example 6, but using:

| | |
|---|---|
| 1 part | Potassium octoate as a trimerization catalyst |
| .5 part | DMP-30 as a cocatalyst |

-continued

| | |
|---|---|
| K-factor: .128 | Flame spread: 35 |
| Smoke: 280 | Compressive strength: 30 psi |
| Density: 3.0 | Cream time: 20 seconds |
| Butler chimney: 89% retained | Cured: 60 seconds |

The foam of Example 1, on exposure to an open propane torch flame, charred and cracked, exposing new foam surface. The foam of Example 2 did not crack, but shrank on exposure to the flame. The addition of MPEG, as in Examples 4 and 5, provides foams which did not char or shrink on exposure to the open propane torch. In all examples, unless melamine of a greater amount than the polyol was used, black smoke appeared.

As seen from the Examples 6–7, trimerized polyisocyanurate foams made with methoxy polyethylene glycols can be produced with excellent fire performance and char strength, and without excessive friability and with excellent dimensional stability.

The preparation of foam compositions of low functionality MDI, MPEG and with and without melamine with a blowing agent, surfactant and trimerization catalyst provided foams of good smoke and flame-spread values and fire-resistant properties.

What is claimed is:

1. A modified polyisocyanurate foam composition, which foam consisting is prepared by:
   reacting 100 parts by weight of a methylene diisocyanate with from about 5 to 40 parts by weight of a polyalkylene glycol composition comprising a $C_1$–$C_3$ alkoxy poly $C_1$–$C_3$ alkylene glycol, the reaction carried out in the presence of a blowing agent to form a foam composition, a surfactant and a single-stage, rapid, high-exotherm, trimerization catalyst, to produce a rigid foam composition having good fire resistance.

2. The foam composition of claim 1 wherein the trimerization catalyst is a quaternary ammonium salt.

3. The foam composition of claim 2 wherein the catalyst comprises a single-stage, high-exotherm, N-hydroxyl alkyl quaternary ammonium carboxylic salt catalyst.

4. The foam composition of claim 1 wherein the trimerization catalyst consists essentially of potassium octoate.

5. The foam composition of claim 1 wherein the glycol composition comprises methoxy polyethylene glycol.

6. The foam composition of claim 1 wherein the glycol composition has an average hydroxyl number of less than about 150.

7. The foam composition of claim 1 wherein the glycol composition includes a combination of polyethylene glycol and methoxy polyethylene glycol.

8. The foam composition of claim 1 wherein the glycol composition comprises a methoxy polyethylene glycol in an amount of from about 5 to 20 parts, and the methoxy polyethylene glycol has a hydroxyl number of about 100 or less.

9. The foam composition of claim 1 wherein the methoxy polyethylene glycol has the formula

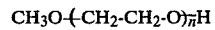

wherein n ranges from about 2 to 20 and wherein the average molecular weight is less than about 600.

10. The foam composition of claim 1 wherein the reaction is characterized by a rapid exotherm of the reaction mixture after mixing to a temperature of about 230° F. or more in about 10 seconds or less.

11. The foam composition of claim 1 which includes a flame-retardant amount of melamine in excess of the amount of the polyalkylene glycol composition.

12. The foam composition of claim 11 wherein the melamine comprises from about 30 to 100 parts by weight per 100 parts of the polyalkylene glycol composition.

13. The foam composition of claim 1 wherein the methylene diisocyanate comprises a methylene diisocyanate mixture having a functionality of less than about 2.7.

14. The foam composition of claim 1 wherein the surfactant comprises from about 0.05 to 5 parts by weight of a silicone glycol surfactant.

15. The foam composition of claim 1 wherein the blowing agent comprises from about 1 to 20 parts by weight of a fluorocarbon.

16. The foam composition of claim 1 wherein the foam is characterized by a flame-spread value as measured under ASTM E-84 of about 25 or less.

17. The foam composition of claim 1 which includes less than about 1 part per 100 parts of the methylene diisocyanate of a sulfonic acid.

18. The foam composition of claim 17 wherein the sulfonic acid comprises from about 0.05% to 0.5% of a toluene sulfonic acid, and wherein the glycol composition comprises a combination of polyethylene glycol and methoxy polyethylene glycol.

19. A modified, melamine isocyanurate foam composition having low flame-spread and smoke values, which foam composition is prepared by:
reacting 100 parts of a methylene diisocyanate having an average functionality of about 2.4 or less, with from about 5 to 40 parts of a polyalkylene glycol composition comprising a combination of a polyethylene glycol and a methoxy polyethylene glycol, and with a flame-retardant amount of melamine, the melamine present in an amount about equal to or greater than the polyalkylene glycol, the reaction carried out in the presence of a blowing agent, to form a foam composition, a surfactant and a catalyst consisting essentially of a quaternary ammonium salt trimerization catalyst, to produce a rigid foam composition.

20. The foam composition of claim 19 which includes less than about 1 part per 100 parts of the methylene diisocyanate of a sulfonic acid, to initiate a glycolester reaction.

21. The foam composition of claim 19 wherein the melamine comprises from about 30 to 100 parts.

22. The foam composition of claim 19 wherein the methoxy polyethylene glycol is a liquid and has an average molecular weight of from about 300 to 550.

23. A modified polyisocyanurate foam composition, which foam composition is prepared by:
reacting 100 parts by weight of a methylene diisocyanate comprising a methylene diisocyanate mixture having a functionality of less than about 2.7, with from about 5 to 40 parts by weight of a polyalkylene glycol composition comprising a $C_1$–$C_3$ alkoxy poly $C_1$–$C_3$ alkylene glycol, the reaction carried out in the presence of a blowing agent to form a foam composition, a surfactant and a single-stage, rapid, high-exotherm, trimerization catalyst, to produce a rigid foam composition having good fire resistance.

24. The foam composition of claim 23 wherein the glycol composition comprises a methoxy polyethylene glycol in an amount of from about 5 to 20 parts, and the methoxy polyethylene glycol has a hydroxyl number of about 100 or less.

25. The foam composition of claim 23 wherein the catalyst comprises a single-stage, high-exotherm, N-hydroxy allkyl quaternary ammonium carboxylic salt catalyst.

26. The foam composition of claim 1 wherein the foam is characterized by a compressive strength of about 30 psi or higher, a flame spread value of 20 or less, and a smoke value of 25 or less.

27. The foam composition of claim 23 wherein the polyalkylene glycol composition comprises a mixture of polyethylene glycol and a liquid methoxy polyethylene glycol.

28. The foam composition of claim 23 wherein the foam is characterized by a compressive strength of about 30 psi or higher, a flame spread value of 20 or less, and a smoke value of 25 or less.

29. The foam composition of claim 23 wherein the methylene diisocyanate mixture has a functionality of less than 2.4.

30. The foam composition of claim 23 wherein the catalyst comprises a single-stage, high-exotherm, N-hydroxyl alkyl quaternary ammonium carboxylic salt catalyst.

* * * * *